(12) United States Patent
Stephani et al.

(10) Patent No.: US 6,968,681 B2
(45) Date of Patent: Nov. 29, 2005

(54) METHOD AND DEVICE FOR AFTERTREATMENT OF EXHAUST GASES FROM COMBUSTION ENGINES

(75) Inventors: Guenter Stephani, Grosserkmannsdorf (DE); Olaf Andersen, Dresden (DE); Gennadi Zikoridse, Dresden (DE); Ernstwendelin Bach, Dresden (DE); Frank Bretschneider, Liegau-Augustusbad (DE)

(73) Assignees: Glatt Systemtechnik GmbH, Dresden (DE); Hochschule fuer Technik und Wirtschaft Dresden, Dresden (DE); Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 10/416,156

(22) PCT Filed: Nov. 17, 2001

(86) PCT No.: PCT/DE01/04363

§ 371 (c)(1),
(2), (4) Date: Nov. 4, 2003

(87) PCT Pub. No.: WO02/40837

PCT Pub. Date: May 23, 2002

(65) Prior Publication Data

US 2004/0065079 A1    Apr. 8, 2004

(30) Foreign Application Priority Data

Nov. 18, 2000  (DE) ................................ 100 58 580

(51) Int. Cl.[7] .............................................. F01N 3/00
(52) U.S. Cl. .......................... 60/297; 60/274; 60/299; 422/171; 422/177; 423/213.7
(58) Field of Search .......................... 60/274, 297, 299, 60/302, 311; 422/169, 170, 171, 177, 180; 423/213.2, 213.7

(56) References Cited

U.S. PATENT DOCUMENTS

| | | | |
|---|---|---|---|
| 2,956,865 A | * | 10/1960 | Williams, Sr. .............. 422/171 |
| 3,180,712 A | * | 4/1965 | Hamblin ..................... 422/171 |
| 3,254,966 A | | 6/1966 | Bloch et al. |
| 3,297,400 A | * | 1/1967 | Eastwood ................ 423/213.2 |
| 3,771,969 A | * | 11/1973 | Scheitlin ..................... 422/171 |
| 3,869,410 A | | 3/1975 | Bunda et al. |
| 4,072,471 A | * | 2/1978 | Morgan et al. ............. 422/171 |
| 4,106,913 A | | 8/1978 | Bunda et al. |

(Continued)

FOREIGN PATENT DOCUMENTS

DE            3436443         4/1986

(Continued)

Primary Examiner—Tu M. Nguyen
(74) Attorney, Agent, or Firm—Jacobson Holman PLLC

(57) ABSTRACT

The invention relates to a device and a method for the aftertreatment of exhaust gases from combustion engines, in particular from internal combustion engines. The device according to the invention and the method are intended to be of simple construction, should be inexpensive to produce and operate and should have less adverse effect on the flow conditions in the exhaust gas stream. To achieve this object, at least one region which is filled with beads is provided in the exhaust-gas stream, the beads preferably being hollow beads. The exhaust gas from the combustion engine is passed through this region, and it is possible to achieve particle agglomeration with simultaneous separation of these particles. In addition, further regions which are filled with metal fibers may follow the at least one region filled with beads, and the exhaust gas is additionally passed through these further regions.

5 Claims, 2 Drawing Sheets

U.S. PATENT DOCUMENTS 4,175,107 A * 11/1979 Iwaoka et al. ............... 422/114
4,290,785 A *  9/1981 Alldredge .................... 95/276
4,338,284 A *  7/1982 Ignoffo ....................... 422/171
4,360,957 A * 11/1982 Eng ............................ 29/890
4,876,072 A * 10/1989 Checki ....................... 422/179
6,428,755 B1 *  8/2002 Rao et al. ................... 422/180

FOREIGN PATENT DOCUMENTS

DE       4234436       4/1994
EP       0142722       5/1985

* cited by examiner

METHOD AND DEVICE FOR AFTERTREATMENT OF EXHAUST GASES FROM COMBUSTION ENGINES

This is a nationalization of PCT/DE01/04363, filed Nov. 17, 2001 and published in German.

BACKGROUND OF THE INVENTION

1. Field of the Invention

The invention relates to a device and method for the aftertreatment of exhaust gases from combustion engines, and in particular for the aftertreatment of exhaust gases from internal combustion engines.

2. Description of the Related Art

In various alternative modifications, it is possible to carry out a catalytic aftertreatment and/or filtering of particles contained in the exhaust gas stream, alone or in combination.

Various possibilities are known for the exhaust-gas aftertreatment of exhaust gases from combustion engines. Additional elements, such as catalytic converters or particle filters, are arranged in an exhaust pipe, and the exhaust gases which are to be treated are passed through such elements or past them, in order to convert pollutant constituents into harmless constituents and to retain particles, in particular particulates produced during combustion in diesel engines.

For the catalytic aftertreatment of exhaust gases, it has hitherto been customary for what is known as a catalytic converter to be integrated in the exhaust pipe, the converter used being a structure which inherently has a relatively large surface area, which is increased still further by a coating which is known per se, to be doped or occupied by catalytically active materials, such as platinum, rhodium and palladium.

However, the catalytic action requires a certain minimum temperature, which with conventional systems can be reached under certain operating regimes, since in the starting phase of an internal combustion engine the required increase in temperature is only brought about by the discharge of exhaust gas. Overheating has to be avoided by the coating which has hitherto been required and increases the active surface area, since these layers, in the event of certain temperatures being exceeded, may be dissolved or flake off, and consequently a catalytic converter of this type cannot be arranged immediately after the exhaust discharge from an internal combustion engine.

A very wide range of filter systems are known to be used to filter particles, and in particular particulates, out of the exhaust gases from internal combustion engines, with both metallic and ceramic materials being used. The deposition of particulates in the known filters has hitherto made it necessary to carry out a step known as regeneration at more or less regular intervals, in order to prevent the filters from becoming substantially blocked, which would cause the dynamic pressure to build up. For regeneration of this type, it is customary to initiate combustion of the particulates which have been separated out in the filter, which requires a supply of energy, inevitably leading to a reduction in efficiency, irrespective of whether electrical heating is introduced or the required combustion is effected by the supply of combustible hydrocarbons.

The flow conditions in the exhaust-gas stream are influenced in particular by the conventional particle filters according to the loading state of the filter material, with the result that in many operating periods it is impossible to maintain optimum combustion conditions as a function of the exhaust gas back pressure.

Moreover, both production and operation of the conventional systems are expensive.

SUMMARY OF THE INVENTION

Therefore, it is an object of the invention to propose a device and a method for exhaust-gas aftertreatment which are of simple construction, inexpensive and have less adverse effect on the flow conditions in the exhaust-gas stream.

According to the invention, this object is achieved by a device and a method in which the exhaust gas is passed through a region that is filled with beads. The device according to the invention for the aftertreatment of exhaust gases from combustion engines uses at least one region which is arranged in the exhaust-gas stream and is filled with beads, and the exhaust gas flows through the spaces between the beads, it being possible for optimum flow conditions to be maintained by the relatively uniform flow guidance. These flow conditions have a particularly advantageous effect for particle agglomeration, and the agglomerates formed can then be separated out of the exhaust gas more efficiently in downstream filter elements, and also filters/filter elements or other elements of this type are protected against exhaust-gas pressure surges.

The flow conditions and pressure ratios in the exhaust-gas section can be calculated relatively easily for a bead-filled region of this type and can be optimized according to the particular combustion engine used, so that combustion is not adversely affected by unfavorable dynamic pressure conditions in the exhaust-gas stream.

It is particularly advantageously possible to use hollow beads which on the one hand effect a considerable reduction in mass and on the other hand are also able to reduce the noise emissions.

Moreover, a certain porosity of the bead surfaces but also of the bead shells can be set relatively easily, with the result that the surface areas can be increased in size and also the fluid-dynamic surface properties can be positively influenced, in order to make the exhaust-gas aftertreatment more effective.

A region which is filled with beads or hollow beads can be arranged in the exhaust-gas section, the beads being held in place, by way of example, by metallic screens, the mesh width of which should, of course, be smaller than the minimum bead diameter, as seen in the direction of flow, in which case virtually any desired arrangement in the exhaust-gas section is possible in principle, but a region of this type should in any event be arranged upstream of a particle filter which may be used, as seen in the direction of flow of the exhaust gas.

However, a region filled with beads may also advantageously be arranged in the immediate vicinity of the combustion engine, at its exhaust-gas outlets, for example directly in an exhaust manifold, in which case it is also possible for a plurality of such regions to be arranged in individual exhaust sections of an exhaust manifold of this type.

The beads should consist of a suitably thermally stable material; it is preferably possible to use metals, on account of their good thermal conductivity.

The beads used may be present as a loose bed in the corresponding region, filling this region as fully as possible. However, it is also possible to produce a spot-sintered assembly of adjacent beads by means of a heat treatment.

It is also possible for beads of different external diameters to be used in a single common region. However, it has proven more appropriate for a plurality of bead-filled regions to be arranged in series, beads of virtually the same external diameter being present in the individual regions, in which case the external diameter of these beads may decrease or increase in graduated form in the direction of flow of the exhaust gas.

However, under all circumstances the beads form a self-supporting framework, so that apart from the sintering which may be performed there is no need for any additional stability-increasing and strength-increasing measures.

The bead-filled region may be surrounded by a housing element, apart from openings through which the exhaust gas can enter and leave, in which case a very wide range of materials with different strengths and thermal stabilities can be used. By way of example, if a metal housing is used, there is also sufficient dissipation of heat, so that the good thermal conduction properties can also be utilized in conjunction with metal beads.

The beads or hollow beads used may be coated or doped with catalytically active materials which are known per se at least at their surface, so that a catalytic aftertreatment of the exhaust gas is possible.

The abovementioned possibility of arranging a bead-filled region in the immediate vicinity of the exhaust-gas outlets from a combustion engine means that the temperatures required for the catalytic activity are reached more quickly than is the case with conventional systems. Moreover, the response can be improved by the relatively low heat capacity, in particular when metallic hollow beads are used.

The housing in which the bead-filled region is arranged should have a larger free cross section than the exhaust pipe parts arranged upstream and downstream of it in the direction of flow, in order to ensure favorable flow conditions for the exhaust gas and a relatively small increase in pressure upstream of the bead-filled region.

The bead diameters may be selected in the range between 1 and 10 mm, it being possible to select hollow bead wall thicknesses of between 0.03 and 1 mm. The porosity of the bead structure may be between 70 and 97%.

In addition to the targeted influencing of the pressure conditions of the exhaust-gas stream, it is advantageous that the exhaust-gas flow following the bead-filled region be as far as possible laminar, which may have advantageous effects in particular for a downstream unit for particle filtration.

For example, it is possible for a further catalytically active element or a particle filter as mentioned above to be arranged downstream in the direction of flow of the exhaust gas.

A particularly advantageous particle filter uses metal fibers with a selectable or adjustable porosity and/or pore size distribution, through which the exhaust gas, in particular from diesel engines, is passed in order to filter/separate out particulates. The pore size distribution may lie in the range from 1 to 500 $\mu$m.

The particle agglomerates formed when the gases are passed through the bead-filled region can be efficiently retained with a metal fiber structure of this type, and an exhaust gas which is virtually free of particles can be discharged to the environment.

A region of this type filled with metal fibers is likewise thermally stable, with the result that it too can be arranged close to combustion engines and in this region too exhaust-gas temperatures which are sufficient to effect automatic regeneration occur, with the result that there is no need to supply additional energy in order to burn particulates.

It is very particularly advantageously possible to select a graduated structure for a particle filter of this type, i.e. a plurality of subregions, each of which have different porosities and/or pore size distributions, the pore size of the filter as far as possible decreasing, are arranged in succession in the direction of flow of the exhaust gas. This is possible by means of a suitable selection of metal fibers and/or by using a suitably dense or less dense packing of metal fibers.

The region which is filled with metal fibers and also the abovementioned subregions of a graduated particle filter may likewise be enclosed by metal screens, and the remaining part may be surrounded by a closed housing, preferably consisting of a metal. The cross-sectional areas of the outlet from the region filled with beads and of the inlet to the region filled with metal fibers should be of the same size and configuration.

The metal fibers can form a sintered, self-supporting structure.

The porosity of the metal fiber structures used may likewise be selected or set in the range between 70 and 95%, and it is also possible to use metal fiber diameters in the range between 0.005 and 0.25 mm.

Both the metal fibers and the beads or hollow beads can advantageously consist of chromium-nickel steels, nickel-base alloys, iron-chromium-aluminum alloys and aluminides. Of course, it is also possible to use other metals or alloys.

As has already been mentioned in connection with the beads or hollow beads, the metal fibers may also be coated or doped with catalytically active materials, with the result that not just particle separation but also a catalytic exhaust-gas aftertreatment can be achieved.

The regions which include metal fibers also have a relatively low mass and form a self-supporting structure. The high porosity which is possible enables a correspondingly high separation rate to be achieved.

Moreover, the noise emissions are reduced, and the good thermal conductivity of the metal fibers, in conjunction with the low heat capacity, allows a response which is likewise good to be achieved both in catalytic aftertreatment and in the automatic cleaning operation (regeneration).

The materials which have been specifically mentioned are not only sufficiently strong, stable and able to withstand high temperatures, but are also highly resistant to corrosion, with the result that a long service life can be achieved.

A redundant parallel arrangement, as has been used hitherto with some known particle filter systems is not necessary, since there is no longer any need to maintain breaks for regenerating particle filters, as has hitherto been necessary.

Both the hollow beads and the metal fibers inherently have a correspondingly high porosity, with the result that an additional coating which increases the surface area is no longer necessary, and the drawbacks which have already been mentioned in this connection can be eliminated.

BRIEF DESCRIPTION OF THE DRAWINGS

The invention is to be explained in more detail below by way of example. In the drawing.

DETAILED DESCRIPTION OF THE INVENTION

Figure 1:
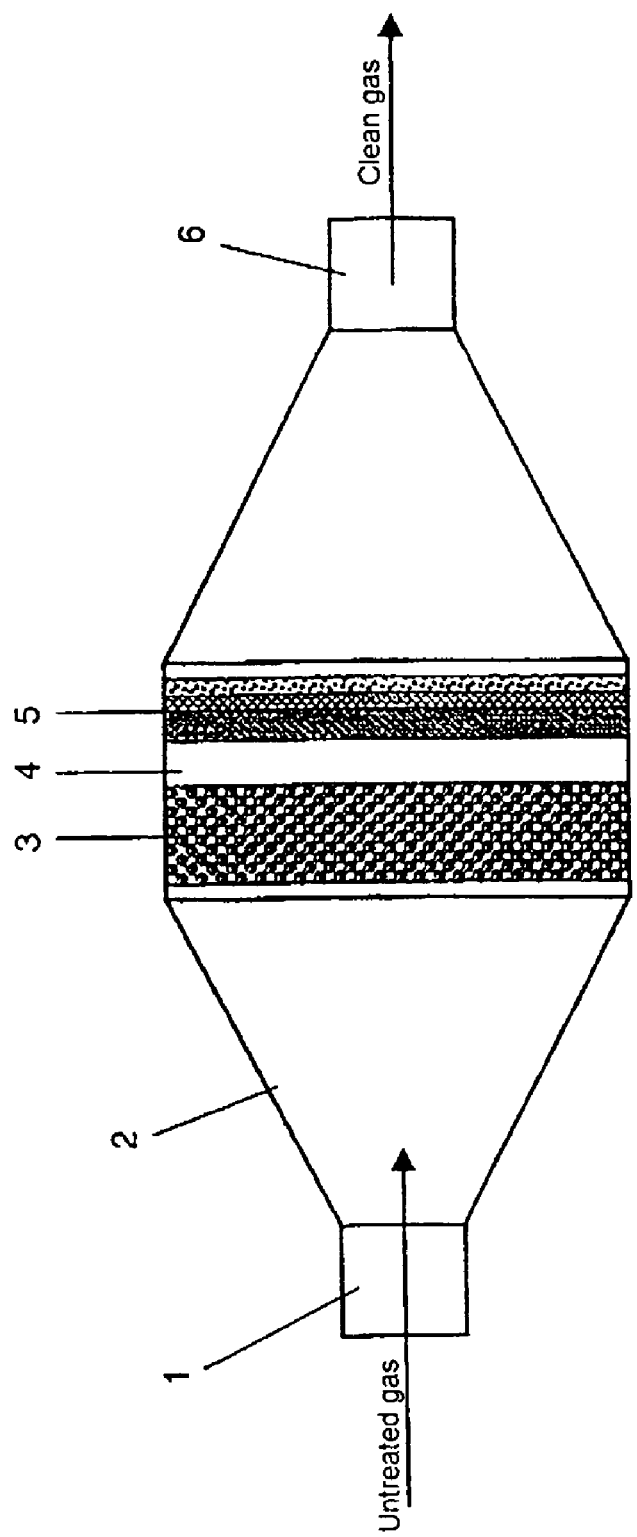
FIG. 1 diagrammatically depicts a structure of an example of a device according to the invention.

In the example of a device according to the invention for the aftertreatment of exhaust gases from combustion engines which is shown in FIG. 1, untreated and uncleaned exhaust gas is passed into a metal housing 2 through a gas inlet connection piece 1. The free cross section of the housing 2 increases in the process.

In the housing 2 there is a region 3 which is filled with hollow metal beads made from a chromium-nickel steel. The hollow metal beads are held inside the housing 2 by metal screens of relatively large mesh width which, however, is smaller than that of the minimum bead diameter, and may be in the form of a loose bed or in sintered form as a self-supporting structure.

The exhaust gas passed through the region 3 which is filled with hollow beads may undergo catalytic aftertreatment if the hollow bead surfaces are coated or doped with a suitable catalytically active material.

In any event, however, the exhaust-gas flow is influenced in such a way that any particles which are present are agglomerated, and the agglomerates formed are separated out of the exhaust-gas stream and retained in the region 5 which follows it in the direction of flow of the exhaust gas and is filled with metal fibers, so that exhaust gas which is as far as possible free of pollutants and particulates can be discharged from the outlet connection piece 6.

In the example of a device according to the invention which is shown in FIG. 1, a cavity 4, through which the as far as possible laminar exhaust-gas flow can enter the region 5 filled with metal fibers, is formed between the region 3 which is filled with hollow beads and the region 5 which is filled with metal fibers.

Figure 2:
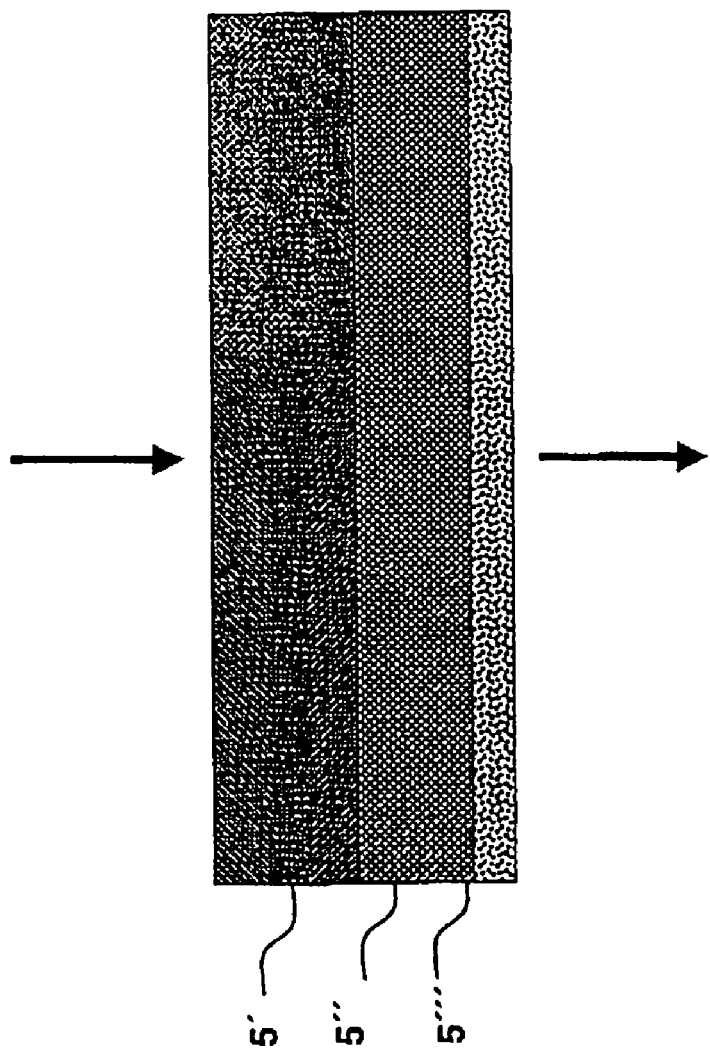
FIG. 2 shows a region for particle separation which is divided into a plurality of subregions which are filled with metal fibers.

In the example shown here, a graduated structure of a region 5 filled with metal fibers is used, a three-stage graduated arrangement being selected, as can be seen more clearly from FIG. 2.

For example, the exhaust gas, which may contain particles, emerges from the region 3 which is filled with hollow beads into a subregion 5' as a coarse filter. In this subregion 5', the metal fibers are selected in such a way that there is a porosity of 90 to 95% and a pore size of 100 to 200 $\mu$m.

Then, in the center, there is a second subregion 5", which is separated from the first subregion 5' in a suitable form which is pervious to exhaust gas. This subregion 5" has a porosity in the range between 80 and 90%, with a pore size of between 50 and 100 $\mu$m, and is responsible for finer separation of smaller particles.

This is followed, in the direction of the gas outlet 6, by a third subregion 5''' likewise filled with metal fibers, the porosity of which has been set to between 60 and 70% and the pore size of which has been set to <50 $\mu$m, so that in this case very fine filtering takes place.

Of course, it is also possible to select a finer graduation with more than the three subregions 5', 5", 5''' which are shown.

Catalytically doped or coated metal fibers may be used in all or in just one or two subregions 5', 5" or 5''', in order to perform an additional catalytic aftertreatment.

The device according to the invention may be of relatively variable design and, by way of example, the region 3 which is filled with hollow beads may be used only to influence the exhaust-gas flow and/or the particle agglomeration which promotes separation, and the catalytic aftertreatment may be an optional feature.

The situation is similar for the regions 5 which are filled with metal fibers and which can be used solely to separate particulates out of the exhaust-gas stream or optionally also to impart a catalytic aftertreatment.

The same material which has been used for the hollow beads and metal fibers can also be used for the housing 2, with the result that there are no significant electrochemical potential differences and the properties mentioned in the general part of the description are also present.

What is claimed is:

1. A method for the aftertreatment of exhaust gases from combustion engines, in which an entire exhaust gas stream is passed through a first region which is filled with beads in order to influence at least one of the flow of exhaust gas, particle agglomeration, or the catalytic aftertreatment of the exhaust gas stream, thereafter passing the exhaust gas stream through a second region which is filled with metal fibers, in order for particles to be filtered out of the exhaust gas or in order for a catalytic exhaust-gas aftertreatment to be carried out, wherein the second region is divided into subregions of different porosities.

2. A device for the aftertreatment of exhaust gases from combustion engines comprising an exhaust gas inlet for receiving an untreated exhaust gas stream, said inlet connected with a housing having a first region filled with beads through which the entire exhaust gas stream passes therethrough, a second region filled with metal fibers, said second region downstream of the first region for receiving the entire exhaust gas stream that is passed through the first region, wherein said second region filled with metal fibers is divided into at least two subregions in layer form each subregion with different porosities or pore size distributions in the direction of flow of the exhaust gas, and an outlet connected with said housing downstream of said second region for receiving the treated exhaust gas that passes through the second region.

3. The device as claimed in claim 2, wherein the porosity is reduced in the direction of flow of the exhaust gas.

4. The device as claimed in claim 2, wherein said porosities are maintained in the range between 70 and 95%.

5. A device for the aftertreatment of exhaust gases from combustion engines comprising an exhaust gas inlet for receiving an untreated exhaust gas stream, said inlet connected with a housing having a first region filled with beads through which the entire exhaust gas stream passes therethrough, a second region filled with metal fibers, said second region downstream of the first region for receiving the entire exhaust gas stream that is passed through the first region, wherein said first and second regions are separated by a cavity and wherein said first region, said cavity, and said second region is increased in size compared to that of the inlet, and an outlet connected with said housing downstream of said second region for receiving the treated exhaust gas that passes through the second region.

* * * * *